(12) United States Patent
Wagner

(10) Patent No.: US 10,760,901 B2
(45) Date of Patent: Sep. 1, 2020

(54) DEVICE FOR ILLUMINATING OBJECTS

(71) Applicant: SAC SIRIUS ADVANCED CYBERNETICS GMBH, Karlsruhe (DE)

(72) Inventor: Christoph Wagner, Königsbach-Stein (DE)

(73) Assignee: SAC SIRIUS ADVANCED CYBERNETICS GMBH, Karlsruhe (DE)

( * ) Notice: Subject to any disclaimer, the term of this patent is extended or adjusted under 35 U.S.C. 154(b) by 0 days.

(21) Appl. No.: 15/740,124

(22) PCT Filed: Jul. 5, 2016

(86) PCT No.: PCT/EP2016/065789
§ 371 (c)(1),
(2) Date: Dec. 27, 2017

(87) PCT Pub. No.: WO2017/005726
PCT Pub. Date: Jan. 12, 2017

(65) Prior Publication Data
US 2018/0188021 A1    Jul. 5, 2018

(30) Foreign Application Priority Data

Jul. 9, 2015 (DE) .................. 10 2015 212 910

(51) Int. Cl.
*G01B 11/25* (2006.01)
*G01N 21/88* (2006.01)
(Continued)

(52) U.S. Cl.
CPC .......... *G01B 11/2513* (2013.01); *G01B 11/30* (2013.01); *G01N 21/8803* (2013.01); *G01N 21/8806* (2013.01); *G03B 15/05* (2013.01); *G01N 2201/0621* (2013.01); *G03B 2215/0514* (2013.01)

(58) Field of Classification Search
CPC ............................ G01B 11/2513; G01B 11/30
See application file for complete search history.

(56) References Cited

U.S. PATENT DOCUMENTS

| | | | | | |
|---|---|---|---|---|---|
| 2,402,926 | A | * | 6/1946 | Herschman | G01B 11/30 250/224 |
| 2007/0031029 | A1 | | 2/2007 | Sasaki | |
| 2008/0164430 | A1 | * | 7/2008 | Diederichs | G01N 21/8806 250/559.08 |

FOREIGN PATENT DOCUMENTS

| | | |
|---|---|---|
| DE | 19653234 A1 | 11/1997 |
| DE | 29805743 U1 | 12/1998 |

(Continued)

OTHER PUBLICATIONS

International Search Report and Written Opinion of the ISA for PCT/EP2016/065789, ISA/EP, Rijswijk, NL, dated Sep. 20, 2016.
(Continued)

*Primary Examiner* — Sharon E Payne
(74) *Attorney, Agent, or Firm* — Stephen T. Olson; Harness, Dickey & Pierce, P.L.C.

(57) ABSTRACT

An apparatus for illuminating objects has an emitting surface and at least two illumination devices. The at least two illumination devices are arranged and designed to generated at least two different illumination distributions on the at least one emitting surface.

20 Claims, 2 Drawing Sheets

Figure 1:
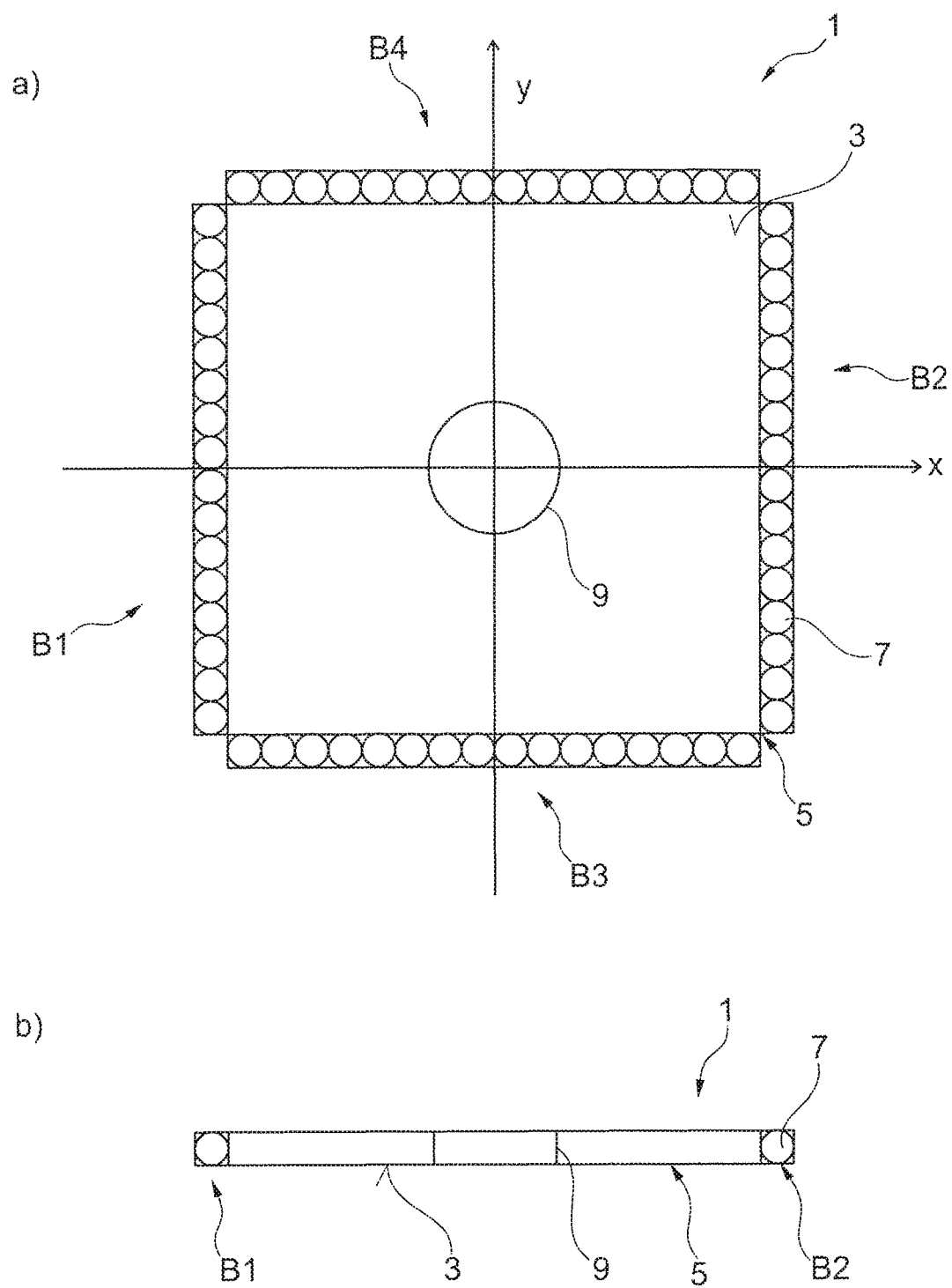

(51) Int. Cl.
*G01B 11/30* (2006.01)
*G03B 15/05* (2006.01)

(56) References Cited

FOREIGN PATENT DOCUMENTS

| DE | 29819954 U1 | 3/1999 |
|---|---|---|
| DE | 19901669 A1 | 8/2000 |
| DE | 19931689 A1 | 1/2001 |
| DE | 10030772 A1 | 10/2001 |
| DE | 10063293 A1 | 7/2002 |
| DE | 10129972 A1 | 1/2003 |
| DE | 10223027 A1 | 5/2003 |
| DE | 69909252 T2 | 5/2004 |
| DE | 202005011807 U1 | 12/2005 |
| DE | 102008022292 A1 | 10/2009 |
| DE | 102011104214 A1 | 12/2012 |
| DE | 102013212827 A1 | 1/2015 |
| DE | 202013104938 U1 | 2/2015 |
| DE | 102015210440 A1 | 12/2015 |
| EP | 1030173 A1 | 8/2000 |
| EP | 2355483 A2 | 8/2011 |
| WO | WO-99/22224 A1 | 5/1999 |
| WO | WO-2015/080941 A1 | 6/2015 |

OTHER PUBLICATIONS

English Translation of the International Preliminary Report on Patentability for PCT/EP2016/065789, IB Geneva, dated Jan. 2018, incorporating the English Translation of the Written Opinion of the ISA, ISA/EP, Rijswijk, NL, dated Sep. 20, 2016.
Observations by Third Parties in corresponding European Patent Application No. 16742189.0, mailed Jun. 17, 2020.

\* cited by examiner

DEVICE FOR ILLUMINATING OBJECTS

CROSS REFERENCE TO RELATED APPLICATIONS

This application is a U.S. National Phase Application under 35 U.S.C. 371 of International Application No. PCT/EP2016/065789 filed on Jul. 5, 2016 and published as WO 2017/005726 A1 on Jan. 12, 2017. This application claims priority to German Application No. 102015212910.1 filed on Jul. 9, 2015. The entire disclosures of all of the above applications are incorporated herein by reference.

FIELD

The invention relates to an apparatus for illuminating objects. In particular, it is intended for use in the visual inspection of industrially manufactured components, keeping pace with the production cycle. The surfaces of these components frequently have optical properties which are characterized by a shiny reflection, whereas others have diffuse reflection characteristics. Examples include components made of metal, plastic or ceramic, and many others.

BACKGROUND

While existing apparatuses and methods are able to inspect the surface of many such components, the necessary technical and financial outlay varies depending on the apparatus and/or method used, and depending on how strict the requirements of the inspection are.

The problem addressed by the invention is therefore that of creating an apparatus which does not have the disadvantages named above. In particular, the apparatus should make it possible to inexpensively detect even the smallest defects on components with sophisticated optical properties.

The special challenge of this problem is that of integrating the components of the apparatus in such a manner that the user has the simplest possible options for installation into the inspection process. At the same time, a cost-effective mass production of the apparatus must be ensured.

SUMMARY

The problem is particularly addressed by creating an apparatus for, in particular, the planar illumination of objects, the apparatus having an emitting surface and at least two illumination devices which can preferably be controlled independently of each other. The at least two illumination devices are arranged and designed to generate at least two different illumination distributions on the at least one emitting surface. In particular, it is possible by means of the apparatus to generate at least two structured illumination distributions or illumination patterns on the emitting surface. By means of the preferably planar, structured illumination generated in this manner, it is possible to illuminate, from a plurality of directions in space, a component being inspected, and to capture the same using a detecting device suitable for this purpose and/or a camera connected thereto. The resulting brightness shading in captured images contains information about the topographic properties of the component surface. The apparatus for preferably planar illumination creates a way to create an illumination of objects from several spatial directions, with a highly integrated, cost-effective and space-saving design, such that it will ultimately be possible to cheaply and quickly detect even the smallest defects on components with challenging optical properties. This can particularly be performed while keeping up with a production cycle.

An "illumination device" is particularly used to mean an apparatus—which can particularly be controlled separately—which is adapted for the emission of electromagnetic radiation in the visible range, in the infrared range, and/or in the UV range. The illumination device can preferably be controlled with regard to a switching time, in particular a lighting duration, a brightness, in particular a luminous or radiant density, and/or an emitted color spectrum. The illumination device may have exactly one light source or a plurality of light sources. A "light source" is used to mean, in particular, a single emission element, for example an LED or OLED, which can emit electromagnetic radiation. The light source may be punctiform or planar.

The at least two illumination devices are preferably arranged on the emitting surface. In particular, they are preferably held on the emitting surface—preferably fixed thereto.

The emitting surface is preferably formed as a single piece, in particular one piece in total. Preferably, the apparatus has a single, integral emitting surface. The at least two illumination devices are arranged in this case on the single, one-piece emitting surface. In particular, all illumination devices of the apparatus are preferably arranged on the single, one-piece emitting surface.

In a preferred embodiment, the emitting surface is formed as a flexible circuit board. In this way, it is particularly possible to furnish a variety of different shapes for the emitting surface in a simple manner, in particular by bending the emitting surface. Preferably, the apparatus has a single, preferably flexible, circuit board as an emitting surface, designed as a single piece.

An embodiment of the apparatus in which a first illumination device of the at least two illumination devices extends along a first direction, and a second illumination device of the at least two illumination devices extends along a second direction, is preferred. The first and the second direction are oriented at an angle to each other. Particularly preferably, the first direction and the second direction are perpendicular to each other. By means of the illumination device, it is possible in this case to generate a structured illumination, in particular along a first, in particular Cartesian direction, and along a second, in particular Cartesian direction, and/or diagonally to two, in particular Cartesian directions. However, it is also possible that at least one of the two directions extends along a curve—in particular in three-dimensional space—wherein the two directions are then—in particular in the region of an actual or imaginary intersection point, which can optionally also lie in an imaginary extension of at least one illumination device—locally oriented obliquely to each other, and in particular are positioned perpendicular to each other locally.

An embodiment of the apparatus is preferred which is characterized by a plurality of illumination devices which are arranged in the form of rows and/or in the form of columns on the emitting surface. In this case, the illumination apparatuses can particularly be controlled independently of each other column by column and/or row by row. In this way, it is possible to very simply, cost-effectively, and quickly create a structured illumination with luminosities which vary row by row and/or column by column. In this case, the control of the plurality of illumination devices is simple, because they can be controlled by column and/or row.

The terms "luminosity" and "luminosity distribution" are particularly used to mean a light density—preferably for visible light—or a radiance—preferably for non-visible radiation, and in particular infrared or ultraviolet radiation.

In a preferred embodiment of the apparatus, all illumination devices extend along the same direction. This can be a Cartesian direction—that is, in particular, a longitude coordinate—an angular coordinate, or a radial coordinate in a non-Cartesian coordinate system, such as a cylindrical coordinate system. It is then possible, by controlling the various illumination devices, to generate at least two different light distributions along one direction which is at least locally perpendicular to the direction in which the illumination devices extend. In particular, it is possible for all the illumination devices to be arranged on the emitting surface as rows, or for all the illumination devices to be arranged on the emitting surface as columns. As a result, specifically variable illumination distributions can be generated perpendicular to the columns or perpendicular to the rows by controlling the illumination devices.

An embodiment of the apparatus is particularly preferred in which the illumination devices can only be controlled as rows and/or columns, and in particular only as entire rows and/or columns. The apparatus is preferably designed in such a manner that the illumination devices can be controlled exclusively as whole rows and/or whole columns. It is particularly preferred in this case that at least one illumination device has, as a column or a row, a plurality of radiating or light sources, which are interconnected with each other in such a manner that the illumination device can only be controlled overall as a whole row or as a whole column. This simplifies the construction of the apparatus considerably, because it dispenses with any complex control and variation of luminosity within the rows and/or columns. As such, there is particularly no point by point control for individual light sources on the emitting surface. Rather, the luminosity on the emitting surface is only varied in the form of whole, individual rows and/or columns. This makes it particularly possible to generate light distributions in which the luminosity—in particular the light density or radiance—varies perpendicular to the first direction in which the first illumination devices extend, and/or perpendicular to the second illumination direction in which the second illumination devices extend. As such, particularly linear illumination distributions, as well as those with other shapes, can be created in, by way of example, the x- or y-direction on the emitting surface, and/or diagonally to the x- and y-direction.

The terms "rows," "columns," "row by row" and "column by column" are particularly used here and in the following in a generalized sense. The terms particularly include, of course, Cartesian rows and columns. However, the terms also include rows and columns extending along other non-Cartesian directions, in particularly along angular coordinates and/or radial coordinates of non-Cartesian coordinate systems—for example, a polar coordinate system, a cylindrical coordinate system, or a spherical coordinate system. As such, by way of example in a cylindrical coordinate system, illumination devices which extend in the circumferential direction—that is, along the azimuth—can form rows which are adjacent as seen in the axial direction, and are particularly arranged side by side, wherein illumination devices which extend in the axial direction and are adjacent in the circumferential direction—that is, as seen along the azimuth—and which are particularly arranged side by side, can form generalized columns. In the same way, columns and rows in, for example, a spherical coordinate system extend along the polar distance on the one hand and along the azimuth on the other hand.

An embodiment of the apparatus is also preferred which is characterized in that the illumination devices are arranged in the form of concentric rings on the preferably flat emitting surface. The emitting surface is then preferably round. It is possible for the illumination device to extend in the form of concentric circles—preferably on a circular emitting surface. However, it is also possible that the concentric rings are oval, in particular elliptical, wherein they preferably have congruent main axes. In this case, the emitting surface is preferably oval. It is particularly preferred that each illumination device forms exactly one ring.

An embodiment of the apparatus is also preferred which is characterized in that the at least two illumination devices are arranged in a round arrangement, preferably in a circular arrangement, on the preferably flat emitting surface, wherein the at least two illumination devices form different sectors. Preferably, the emitting surface is round, in particular circular, wherein the at least two illumination devices form different sectors on the round, preferably circular, emitting surface. However, an oval arrangement of the illumination devices on the emitting surface is also possible, and/or it is possible that the emitting surface itself is oval. In any case, an (imaginary) boundary between two different illumination devices preferably extends in this case in the radial direction, specifically as a sector boundary. It is possible that at least one illumination device extends in the radial direction. Preferably, all illumination devices extend in the radial direction.

It is thus possible that at least one illumination device extends, as a generalized row, in a polar coordinate system along the angular coordinate, wherein it is particularly possible that two or more illumination devices which form a plurality of such generalized rows are arranged next to each other, and in particular adjacent to each other, as viewed in the radial direction. Alternatively or additionally, it is possible that at least one illumination device extends along the radial direction in a polar coordinate system as a generalized column. In particular, it is possible that two or more illuminating devices which form such generalized columns are arranged next to each other, and particularly adjacent to each other, as viewed in the circumferential direction—that is, in the direction of the angular coordinate. In the first case, the illumination devices particularly form concentric rings; in the second case they particularly form sectors on the emitting surface. Particularly preferred is a combination of these cases, in an embodiment having a plurality of illumination devices, wherein at least one illumination device extends along the angular coordinate, in particular as a generalized row, and at least one second illumination device extends along the radial direction, in particular as a generalized column. Particularly preferably, a matrix-like arrangement of illumination devices in a polar coordinate system is possible, wherein two or more illumination devices extend in the form of generalized rows along the angular coordinate, and additionally, two or more illumination devices extend along the radial direction in the form of generalized columns. It is also possible that illumination devices which have exactly one light or radiating source are arranged on the emitting surface in a corresponding matrix arrangement of a polar coordinate system, wherein these illumination devices then can preferably be individually controlled as individual pixels, particularly as regards a luminosity or light duration.

Also preferred is an embodiment which is characterized in that a first illumination device of the at least two illumination devices extends along a first angular coordinate, and a second illumination device of the at least two illumination devices extends along a radial coordinate. This embodiment is particularly preferred for an emitting surface which is curved in at least one direction, particularly for a cylindrical or cylinder-segment-shaped emitting surface, wherein the angular coordinate represents an azimuth and the radial coordinate preferably represents an axial direction of a cylindrical coordinate system on the emitting surface.

Also preferred is an embodiment of the apparatus in which a first illumination device of the at least two illumination devices extends along a first angular coordinate, wherein a second illumination device of the at least two illumination devices extends along a second angular coordinate which is different from the first. This embodiment is particularly preferred for an emitting surface which is curved in at least two directions, especially for a spherical or spherical-segment-shaped emitting surface. In this case, the first angular coordinate is preferably an azimuth, and the second angular coordinate is a pole distance of a spherical coordinate system on the emitting surface.

Also preferred is an embodiment of the apparatus which is characterized in that the at least one illumination device has a plurality of light sources arranged next to each other along the extension direction of the illumination device. This constitutes a particularly simple and cost-effective implementation of the illumination device, since it can be composed of individual light sources. In particular, it is possible to design the light sources as light-emitting diodes (LED) or organic light-emitting diodes (OLED). Particularly preferably, the at least one illumination device is designed in the form of a row or column of light sources, in particular light-emitting diodes, arranged next to each other. It is possible that the light sources are substantially punctiform. Alternatively or additionally, it is possible that planar light sources are used. In particular, organic light-emitting diodes are typically designed as planar light sources. A planar light source preferably has the shape of a rectangle, in particular a square, or any other geometric border. Particularly preferred is a geometry for a planar light source which enables completely tiling the emitting surface with a plurality of such light sources. This is particularly possible with rectangular, in particular square light sources, but also with hexagonal-bordered, planar light sources, by way of example.

Also preferred is an embodiment of the apparatus which is characterized in that the at least one illumination device has exactly one, and only one, particularly locally concentrated radiating source, which comprises at least one light source. In this case, a light emitting device which has a light source or a plurality of separate—in particular, separately controllable—light sources is considered a radiating source. For example, the radiating source may comprise a plurality of light sources which emit different colors. In particular, it is possible that the radiating source comprises a red light source, a green light source and a blue light source. Other embodiments of light sources, in particular for additive color mixing of the light emitted by the radiating source, are possible.

A locally concentrated radiating source particularly means a radiating source that is arranged inside an imaginary circle having a radius which is much smaller than a length of the emitting surface. Preferably, the diameter of the imaginary circle is smaller at least by a factor of 10, preferably by a factor of 10 to 100, than an extension of the emitting surface along its longest dimension. In particular, the locally concentrated radiating source is a punctiform radiating source, which therefore extends along a certain direction in—at most—a negligible manner, and rather forms a punctiform emitter as seen on the whole emitting surface.

In one embodiment of the apparatus, it is possible that such a radiating source is designed as an integrated, separately controllable component which has at least one light source, in particular at least one light emitting diode, and an integrated electronic circuit for supplying current to and controlling the at least one light source, wherein the at least one light source and the electronic circuit are integrated with each other. Alternatively, it is possible that the radiating source is composed of at least one light source, provided separately from an electronic circuit, and the electronic circuit, which in turn is provided separately from the at least one light source. It is possible that each light source is assigned a dedicated electronic circuit, such that the light source and its associated electronic circuitry form a radiating source. However, it is also possible that an electronic circuit is included which is assigned to the total number of light sources, in particular all light sources together, wherein, however, preferably each light source can preferably be controlled separately and independently from the other light sources by means of the electronic circuit. In this case, a single radiating source comprises a light source, and electrical connections or leads which can be assigned to the same, in particular as parts of the electronic circuit which can be individually assigned to the light source.

In a preferred embodiment, the apparatus has exactly two circuit boards, namely a first circuit board on which the light sources and/or radiating sources are preferably arranged, and a second circuit board on which the at least one electronic circuit is preferably arranged. Alternatively or additionally, a control device for illumination control, in particular for specifying luminosities for the radiation and/or light sources, is preferably arranged on the second circuit board. It is possible that at least one electronic circuit or electronic circuits for the light and/or radiating sources, which can be controlled by the control device, are/is arranged particularly together with the light and/or radiating sources on the first circuit board. The circuit boards are preferably spaced from each other in a direction which is perpendicular to imaginary planes of the circuit boards—that is, one behind the other. Preferably, at least one of the circuit boards is flexible. Particularly preferably, both circuit boards are flexible.

Individual radiating sources of the apparatus can preferably be connected to each other—and in particular, cascaded. It is possible in this case for radiating sources arranged along a direction to be connected to each other—in particular, cascaded. Alternatively or additionally, it is possible for radiating sources along different directions to be cascaded together. In particular, it is also possible for all radiating sources of the apparatus to be cascaded together. In this context, a cascaded arrangement particularly means that radiating sources which are arranged cascaded together are connected to each other with respect to a data line or control line, wherein the radiating sources are preferably connected in parallel or connected in series, wherein a control output of a preceding radiating source along a series of radiating sources connected to each other is connected to a control input of a subsequent radiating source. The radiating sources are preferably, however, designed to be controlled separately from each other, and particularly independently of each other, particularly by bit patterns specially provided for this purpose on a data line, and/or by individual addressing of the individual radiating sources. In this case, in particular, a color, a luminosity and/or a switch-on time or illumination duration of the individual radiating sources can be selected or prespecified independently of the other radiating sources.

It is possible that the light sources or radiating sources, which are also referred to in general as "sources," are arranged equidistant from each other as viewed along at least one direction. However, this can lead, particularly if at least one direction extends along a curved line, to an inhomogeneous number density of the sources on the emitting surface. For example, if the sources are arranged in the form of concentric rings which are arranged equidistantly in the radial direction and in the angular direction, the result is an increased number density of the sources towards a center of the arrangement. Therefore, it is alternatively also possible that the sources—independently of the coordinate system being considered—are arranged with a number density which is constant on the emitting surface. This can optionally—as stated above—require a non-equidistant arrangement of the sources along at least one direction.

However, it is also possible that the number density of sources on the emitting surface is adapted according to requirements, in particular to a specific illumination task. The number density of the sources can therefore preferably vary along the emitting surface. For example, it is possible to provide a smaller number density of sources in the region of a center of the emitting surface.

For the arrangement of sources on non-planar or curved emitting surfaces, different procedures, and in particular different projection methods, are possible. For example, it is possible to initially arrange imaginary sources in a conical or conical-segment-shaped emitting surface equidistantly in rows and columns on an imaginary, irradiated plane—in particular a base plane of the cone or conical-segment-shaped geometry, and to then project this arrangement of imaginary sources onto an inner or outer conical surface, and thus onto the emitting surface, wherein the actual sources are then arranged at the locations of the projected, imaginary sources. An analogous procedure is also possible for a sector representation or concentric circles on the imaginary irradiated plane. An analogous procedure is also possible for a spherical or spherical-segment-shaped emitting surface, wherein an imaginary arrangement of imaginary sources on a sectional plane—in particular on an equatorial plane or a plane in which a great circle lies—can be arranged equidistantly in particular row by row or column by column, or with equal angular intervals in at least one angular direction, or in another manner, and then projected onto the emitting surface. In particular, different projection methods can also be contemplated—in particular, involving rear projection. An example would be a reverse Mercator projection of a planar distribution on a spherical surface. Similar projection methods can also be contemplated for freeform surfaces.

An imaginary arrangement of imaginary sources in an imaginary, non-curved plane below the emitting surface as seen in the emission direction, in particular in an imaginary plane illuminated by the apparatus, is generally preferred, wherein this distribution is then projected by imaginary sources onto the emitting surface, in which case the actual sources are arranged at the locations of the projected, imaginary sources.

In one embodiment of the apparatus, a plurality of illumination devices, each having exactly one and only one radiating source, is arranged in the form of a matrix on the emitting surface. The individual illumination devices in this case can preferably be controlled independently of each other as single pixels of the matrix-like arrangement, in particular with prespecifiable luminosity or illumination duration. A matrix-like arrangement is particularly used to mean an ordered arrangement of elements along at least two coordinates, wherein the coordinates may be Cartesian coordinates, and/or polar, cylindrical, spherical or other coordinates.

However, an embodiment of the apparatus is also possible in which the illumination devices are arranged freely—in particular, equidistantly, or even irregularly—on the emitting surface, wherein the illumination devices can preferably be controlled independently of each other, in particular with a prespecifiable luminosity or illumination duration.

Also preferred is an embodiment of the apparatus which is characterized in that immediately adjacent light or radiating sources, and/or immediately adjacent illuminating devices are arranged at a distance—which is particularly measured from a midpoint, a center of gravity, or a center to a subsequent midpoint, center of gravity, or center of the sources or illumination devices—of at least 0.5 mm to at most 200 mm, preferably at least 1 mm to at most 100 mm, preferably at least 2 mm to at most 50 mm, preferably of at least 5 mm to at most 20 mm, and preferably of 10 mm. The spacing is therefore preferably a center distance—that is, a distance from a midpoint, center of gravity, or center of a source to a subsequent midpoint, center of gravity, or center of a subsequent, adjacent source. This indication of such a spacing does not rule out that adjacent sources, especially planar adjacent sources, directly adjoin each other on their edges. However, it is also possible that adjacent sources are spaced apart from each other in the region of their edges.

The distance, in particular the center distance, is preferably of at least 1 mm to at most 200 mm, preferably of at least 2 mm to at most 200 mm, preferably of at least 5 mm to at most 200 mm, and preferably of at least 10 mm to at most 200 mm.

The distance, in particular the center distance, is preferably of at least 1 mm to at most 50 mm, preferably of at least 1 mm to at most 20 mm, and preferably of at least 1 mm to at most 10 mm.

In a preferred embodiment of the apparatus, a surface area measure of the emitting surface—that is, the area of the emitting surface—is of at least 100 mm$^2$ to at most 1 m$^2$, preferably of at least 100 mm$^2$ to at most 0.5 m$^2$, preferably of at least 100 mm$^2$ to at most 0.2 m$^2$, and preferably of at least 100 mm$^2$ to at most 0.1 m$^2$.

Preferably, the emitting surface is of at least 0.02 m$^2$ to at most 0.25 m$^2$, preferably of at least 0.05 m$^2$ to at most 0.25 m$^2$, preferably of at least 0.1 m$^2$ to at most 0.25 m$^2$, and preferably of at least 0.2 m$^2$ to at most 0.25 m$^2$.

This is particularly preferred in conjunction with an apparatus which has a plurality of illumination devices which are arranged, on the one hand, in the form of rows, and on the other hand in the form of columns, wherein ultimately a matrix-like arrangement of light sources results, each having a spacing from each other as mentioned above. As such, no reliance is made on a finer layout of light sources, because such a layout is not necessary for an efficient illumination of objects with the aim of detecting even the smallest defects in challenging optical properties. Rather, a comparatively coarse layout of the light sources is sufficient for this purpose, such that an inexpensive apparatus with a simple design and structure can be achieved. The illumination devices arranged in this way can preferably be controlled independently of each other—in particular as whole rows and/or columns. In this case, it is particularly preferred that an individual control of the individual light sources is omitted—that is, preferably no matrix-like control of individual points of light is implemented. Rather, only whole rows and/or columns of light sources can be controlled individually and independently of each other, wherein all the light sources of a row and/or column are controlled in common. This drastically reduces the complexity of the control of the apparatus, such that it is more cost-effective, and particularly higher control frequencies are possible. As such, high-frequency changes in illumination distributions are also possible, and this particularly enables an inspection of components while keeping pace with the production cycle.

An embodiment of the apparatus is also preferred which is characterized in that at least two groups of illumination devices are included, wherein a first group of illumination devices is arranged and can be controlled as a column, and a second group of illumination devices is arranged and can be controlled as a row on the emitting surface. In this case not every light source of an illumination device is functionally assigned to a row on the one hand and a column on the other hand, as is the case in a matrix-like arrangement of light sources. Rather, individual groups of light sources make up illumination devices which can be controlled as rows, while other individual groups of light sources make up illumination devices which can be controlled as columns. Such a configuration again reduces the complexity of the apparatus and its control, and also particularly enables creating illumination distributions which run diagonally, extending obliquely to the rows and columns, without the need to depart from the principle of controlling the illumination devices only row by row and/or column by column. Specifically, it is readily possible to control the rows and columns independently of each other—essentially overlapping the same—in such a manner, that, overall, a diagonal illumination distribution is created.

Also preferred is an embodiment of the apparatus which is characterized in that a control device is included which is adapted to control the illumination devices. As such, the previously mentioned advantages are particularly realized. The control device is particularly designed to generate the at least two different illumination distributions by controlling the illumination devices. The control device is preferably adapted for the separate control of the illumination devices independently of each other. Particularly preferably, the control device is adapted for row by row and/or column by column control of the illumination device. Particularly in this way, the previously mentioned advantages of a row by row and/or column by column control can be realized. The control device is preferably customized to exclusively control whole rows and/or columns of illumination devices, wherein the control device can be of simple construction and at the same time operable at a high frequency. In particular, it is preferred that a pixel by pixel control of light sources arranged on the emitting surface is expressly omitted. Rather, the same are controlled exclusively as whole rows and/or whole columns—in particular as whole rows and whole columns.

An embodiment of the apparatus is also preferred which is characterized in that the apparatus is adapted to change between different illumination distributions with a frequency of at least 150 Hz to at most 2 MHz, preferably of at least 500 Hz to at most 1 MHz, preferably of at least 2 kHz to at most 200 kHz, and preferably of at least 10 kHz to at most 50 kHz, preferably 25 kHz. It turns out that a high-frequency control by means of the control device is possible particularly because of the very simple design of the apparatus and the simple controllability of individual rows and/or columns.

The apparatus is preferably adapted to change between different illumination distributions at a frequency of at least 500 Hz to at most 2 MHz, preferably of at least 2 kHz to at most 2 MHz, preferably of at least 10 kHz to at most 2 MHz, and preferably of at least 25 kHz to a maximum of 2 MHz. Preferably, the apparatus is adapted to change between different illumination distributions with a frequency of at least 150 Hz to at most 1 MHz, preferably of at least 150 Hz to at most 200 kHz, preferably of at least 150 kHz to at most 50 kHz, and preferably of at least 150 Hz to at most 25 kHz.

Also preferred is an embodiment of the apparatus which is characterized in that the control device is adapted to control the luminosity of the illumination devices by specifying an illumination time. In this case, the luminosity of an individual illumination device, in particular a row or a column, is not selected by variations of an electrical control variable—in particular, that is, a voltage or a current. Rather, it is selected via the switching time—in particular, via a switch-on time—which is also known as the illumination time. For this purpose, a time is preferably determined which corresponds as an illumination time to a luminosity of 100%, and which hereinafter is referred to as the maximum illumination time. The luminosity of individual illumination means—in particular, rows and/or columns—can be varied from 0% to 100% by individually selecting the illumination time for the individual illumination devices between 0% and 100% of the maximum illumination time. The maximum illumination time preferably corresponds to a prespecified exposure time of a camera with which images are captured of an object which is illuminated by means of the apparatus. The individual luminosity of the different illumination devices is particularly created by integration over the exposure time—and therefore over the maximum illumination time. The shorter the illumination time of an individual illumination, the lower the luminosity generated by the same appears in a recorded image. Such a control has proven to be particularly simple and inexpensive to implement in a controller. Preferably, the controller is operatively connected to a camera for image capture, such that the maximum illumination time can be made the same as the exposure time. Preferably, the control device has at least one interface for an operative connection to at least one camera. Particularly preferably, the control device is adapted to synchronize the control of the illumination devices with the exposure time of the camera. In particular, it is possible that the control device is adapted to synchronize the camera and the illuminating devices with each other.

The adjustment of the luminosity of the illumination devices by specifying an illumination time is advantageous compared to a variation of a current parameter, particularly a current strength, because in this case much lower heat dissipation is required than in a situation where, in particular, an individual current control would be included for each illumination device. The apparatus can therefore be more efficiently designed and smaller in construction. In particular, the size of heat sinks can be reduced, or heat sinks can be omitted.

The apparatus is preferably adapted to switch the illumination devices in a digital manner—that is, to switch them on or off—without individually varying a current supply to the illumination device with respect to a current parameter, in particular a voltage or a current strength, in or for the switched-on state of the illumination devices.

An embodiment of the apparatus is also preferred which is characterized in that a scattering element is arranged in front of the emitting surface, in the direction of an object being illuminated—that is, in the emission direction of the light as seen from the emitting surface. The scattering element serves to homogenize or smooth the illumination distribution generated by the illumination device, and particularly to level the illumination peaks generated at the positions of individual light sources, and distribute in a planar manner the relatively punctiform light emitted by the light sources. In this case, a distance of the scattering element from the emitting surface, and in particular from the individual light sources, is preferably chosen in such a manner that the most homogeneous and smooth possible illumination distribution results between the individual light sources.

Preferably, the distance of the scattering element from the emitting surface is—in particular, as measured perpendicular to the emitting surface and/or the scattering element—of at least 0.5 mm to at most 200 mm, preferably of at least 1 mm to at most 100 mm, preferably of at least 2 mm to at most 50 mm, and preferably of at least 5 mm to at most 20 mm, preferably 10 mm. In a preferred embodiment, the distance of the scattering element from the emitting surface is of at least 1 mm to at most 200 mm, preferably of at least 1 mm to at most 50 mm, preferably of at least 1 mm to at most 20 mm, and preferably of at least 1 mm to at most 10 mm. In a preferred embodiment of the apparatus, the distance of the scattering element from the emitting surface is of at least 2 mm to at most 200 mm, preferably of at least 5 mm to at most 200 mm, and preferably of at least 10 mm to at most 200 mm.

The distance of the scattering element from the emitting surface is preferably selected to be equal to the distance between the individual sources—in particular, the light sources or radiating sources, on the emitting surface.

The scattering element is preferably designed as a scattering body, in particular as a diffusing plate, as a diffusing film, or in another suitable manner.

An embodiment of the apparatus is preferred which is characterized in that the emitting surface is formed on a transparent plate, wherein at least two edges of the transparent plate for each illumination device are arranged in such a manner that radiation emitted from the illumination device is coupled into the transparent plate. The transparent plate thus extends particularly along an imaginary plane, and it comprises edges into which radiation is coupled into the transparent plate. Particularly preferably, the transparent plate has four edge sections or four edges, wherein four illumination devices which can be controlled independently of each other are arranged on the edge sections or edges. If the emitting surface of such a transparent plate is arranged on the outside, there is no need to arrange a plurality of light sources or illumination devices on the emitting surface itself. The apparatus thus formed is therefore particularly simple and inexpensive in construction.

The transparent plate is designed as a clear transparent plate in a preferred embodiment. In another embodiment, it is possible that the transparent plate is designed as a diffusely scattering plate, in particular as a volume scattering element.

An embodiment of the apparatus is preferred which is characterized in that the transparent plate has an output coupling structure. This is particularly preferred when a clear transparent plate is used which has no intrinsic, relevant scattering centers, particularly within its volume. Typically, radiation coupled into the transparent plate laterally on the edges cannot readily leave the plate, such that the radiation in the plate is reflected back and forth between the emitting surface, on one side, and a boundary surface opposite thereto, on the other side. In this case, an output coupling structure is preferably included to enable the emission of radiation from the emitting surface. A diffuse scattering is generated in the emitting surface by means of the output coupling structure, in a simple and cost-effective manner. Preferably, the output coupling structure is included on the emitting surface. Preferably, the output coupling structure is furnished by roughening the emitting surface and/or by applying a diffuse scattering film on the emitting surface. It is also possible to include fine geometrical structures in the emitting surface—for example, a pattern of rows, points or other distortions of the surface of the transparent plate. These can particularly be deliberately introduced defects. It is additionally or alternatively possible that the output coupling structure is arranged on the boundary surface opposite the emitting surface. In particular, it is possible that individual scattering centers, in particular individual points which scatter light in the direction of the emitting surface, are arranged on the opposite boundary surface. Such points can be applied to the opposite boundary surface in the form of a film and/or consist of particularly punctiform or circular film sections, by way of example. Other geometries for such scattering centers are possible. The scattering centers arranged on the opposite boundary surface are preferably white on a side which faces the emitting surface, and therefore have an increased scattering capacity in this direction. The scattering centers on the side facing away from the emitting surface are preferably black, so as to prevent a light scattering—in particular, of ambient light—into a camera arranged on a side which faces away from the illuminated object and the emitting surface. If the transparent plate is fully transparent, including the scattering centers, it is possible that the camera peers directly through the transparent plate to see an object positioned beyond the plate on the side of the emitting surface, without any particular viewing aperture or explicitly-included viewing area. Specifically if the clear transparent plate is not arranged in a focal plane of the camera, the scattering centers particularly only slightly disturb the resulting camera image—and preferably at most in a manner which is irrelevant for the further evaluation of the camera image.

Preferably, a shielding element is arranged on the side of the apparatus facing away from the emitting surface, and is arranged and adapted to prevent scattered light from the apparatus and/or scattered light from an environment of the apparatus from entering into an optical system, in particular a camera. The shielding element can be arranged directly on the boundary surface opposite the emitting surface, and particularly fixed thereto, or can be arranged at a distance from this boundary surface. It is particularly possible that the shielding element is formed as a film which is arranged on the boundary surface—optionally in the form of individual points—and particularly glued onto the boundary surface. It is possible in this case that this film is white on its side facing the emitting surface, and is black on its side facing away from the emitting surface. Additionally or alternatively, a shielding element designed as a shading element can be included, in particular at a distance from the boundary surface. As such, it can be designed in the form of a screen or in any other suitable manner, for example.

Also preferred is an embodiment of the apparatus which is characterized in that the emitting surface comprises a viewing area, wherein a viewing area is preferably arranged in the emitting surface. In a simple manner, an optical system, such as a lens and/or a camera, can be positioned relative to the viewing area in such a manner that an object illuminated by means of the apparatus for planar illumination can be observed by the optical system through the viewing area. The viewing area preferably has an aperture which corresponds to an outer diameter of the optical system and/or the camera, or is at most slightly larger. It is also possible that the viewing area is larger than the aperture, especially if a distance from the viewing area to the camera or to a lens is greater than the aperture. Conversely, it is also possible that the viewing area is smaller than the aperture, especially if there is a narrow spacing between the camera or the lens and the viewing area, wherein the size of an aperture of the camera or of the lens is particularly relevant for the sizing of the visual range. Preferably, the viewing area is arranged centrally or in the middle on or in the emitting surface. However, it is also possible that the viewing area is arranged off-center. It is also possible that the emitting surface has more than one viewing area, in particular for arranging a plurality of cameras or optical systems.

A viewing area in this case particularly means an area through which an object arranged beyond the emitting surface, as seen from the perspective of the camera or the lens, can be observed by the camera or the lens. This area therefore allows the passage of light, particularly light emanating from the object, to the camera or the lens. It is possible that the viewing area is included as a non-scattering region of an emitting surface on which scattering centers are arranged in the remaining regions. In particular, it is possible that the viewing area is included as an untreated area of a transparent, particularly clear transparent, plate on the emitting surface. Alternatively, it is possible that the viewing area is designed as a sight opening in the emitting surface. In this case, the emitting surface preferably has a recess or cavity, in particular in the manner of a through-hole, which serves as a sight opening through which an object can be observed by the camera or the lens. The emitting surface is preferably only given a scattering treatment outside of the viewing area.

Also preferred is an embodiment of the apparatus which is characterized in that the emitting surface is flat. This constitutes a very simple embodiment. Alternatively, it is possible that the emitting surface is bent or curved. In this case, the emitting surface can be particularly adapted to a specific task for which the apparatus is used—specifically to particular components which will be detected or inspected. In particular, it is possible that the emitting surface is cylindrical, cylinder-segment-shaped, tapered, conical-segment-shaped, spherical, spherical-segment-shaped, or in the form of a free-form surface, preferably with squared—in particular, rectangular or square—or circular or oval borders.

Finally, an embodiment of the apparatus is preferred which is characterized in that the light sources of an illumination device are at least partially connected together in series. This makes it particularly possible to adjust an electric voltage used to control the light sources to a desired value, particularly if an individual light source would have a voltage which is too low. In particular, light sources of a single row or a single column of the apparatus are connected in series, at least in sections, preferably in sections or as a whole. It is possible in this case that a single column and/or a single row, and therefore particularly a single illumination device, has a plurality of light sources connected in series as groups, or has light sources connected in series to each other as an arrangement.

The apparatus is preferably compact in design, in particular for an arrangement on a robotic arm, and in particular on a robotic hand of a robotic arm. As such, the apparatus can be used in a particularly flexible and versatile manner, particularly for manufacturing processes.

The invention also includes a device for the visual detection of surfaces, in particular for the visual inspection of surfaces and/or for detecting the shape of objects. The device comprises a camera, preferably with a lens. In addition, the device has an apparatus for the preferably planar illumination of objects, having an emitting surface and at least two, preferably independently controllable, illumination devices, wherein the at least two illumination devices are arranged and adapted to generate at least two different illumination distributions on the at least one emitting surface. Particularly preferably, the device has an apparatus according to one of the embodiments described above. In this case, a control device for controlling the illumination device is preferably included. This is preferably operatively connected to a control device for the at least one camera, or the control device additionally performs the task of controlling the camera, in addition to controlling the illumination device—particularly specifying an exposure time. The device further preferably comprises a computing device, which is adapted to carry out calculations on captured images and to generate calculated images from the captured images by applying suitable algorithms, particularly in order to detect even the smallest defects on inspected components, wherein the components may have optically challenging properties.

The control device is preferably adapted to synchronize the illumination devices and the at least one camera to each other. Specifically, the control device is preferably adapted to specify a maximum illumination time for the illumination devices, which corresponds to an exposure time of the camera.

Furthermore, the control device is preferably adapted to vary a luminosity of the illumination devices by specifying illumination times for the illumination devices, particularly by controlling the illumination devices using the control device to achieve illumination times which are less than or equal in length to the maximum illumination time. The control device is preferably adapted to control the illumination devices separately and independently of each other, particularly with regard to their illumination times. By means of the control device, the illumination devices, on the one hand, and the camera, on the other hand, can be explicitly coupled to each other to achieve a chronological control.

It is also possible that the control device is integrated into the camera. Particularly, it is possible that a chronological scheme for the various illumination distributions is set in or on the camera, wherein the camera then outputs at least one signal to control the illumination devices. In this manner, it is possible that the control device is designed as a control device of the camera, which is operatively connected to the illumination devices to control the same, wherein said control device additionally also performs the task of controlling the illumination devices in addition to controlling the camera.

It is also possible that the control device is integrated into the camera and/or into the apparatus used for illumination. Particularly, it is possible that the control device is designed as a field programmable gate array (FPGA).

It is also possible that the computing device is integrated into the camera and/or into the apparatus used for illumination. Particularly, it is possible that the computing device is designed as a field programmable gate array (FPGA). It is also possible that the computing device is integrated into the control device, or that the control device takes over the functionality of the computing device. It is also possible that the computing device is furnished as an external computing device—for example, as a personal computer or server, or in another suitable manner.

The device for the visual detection of surfaces is preferably compact in design, particularly for an arrangement on a robotic arm, particularly preferably on a robotic hand of a robotic arm. In this way, the device as a whole can be used in a very flexible and versatile manner, particularly for manufacturing processes.

The invention also includes a method for the visual inspection of surfaces and/or for detecting the shape of objects, wherein an apparatus for illumination, according to any one of the embodiments described above, and/or a device according to any one of the embodiments described above, is used. The various illumination devices are particularly controlled in this case to generate at least two different illumination distributions on the at least one emitting surface. The advantages which have already been explained in connection with the apparatus and the device also arise with the method.

An embodiment of the method is particularly preferred in which the illumination devices are controlled row by row and/or column by column, independently of each other, and more preferably only in the form of whole rows and/or only in the form of whole columns.

The descriptions of the apparatus and of the device, on the one hand, and the method, on the other hand, should be considered complementary to each other. Particularly, features of the apparatus or the device which have been explained explicitly or implicitly in the context of the method are preferably features of a preferred embodiment of the apparatus or the device, alone or in combination. Method steps which have been explicitly or implicitly described in the context of the apparatus or the device are preferably steps of a preferred embodiment of the method, alone or in combination. The method is preferably characterized by at least one method step which is based on at least one feature of the embodiment, according to the invention or preferred, of the apparatus or the device. The apparatus and/or the device is/are preferably characterized by at least one feature which is based on at least one method step, according to the invention or preferred, of the method.

BEST DESCRIPTION OF THE DRAWINGS

Figure 2:
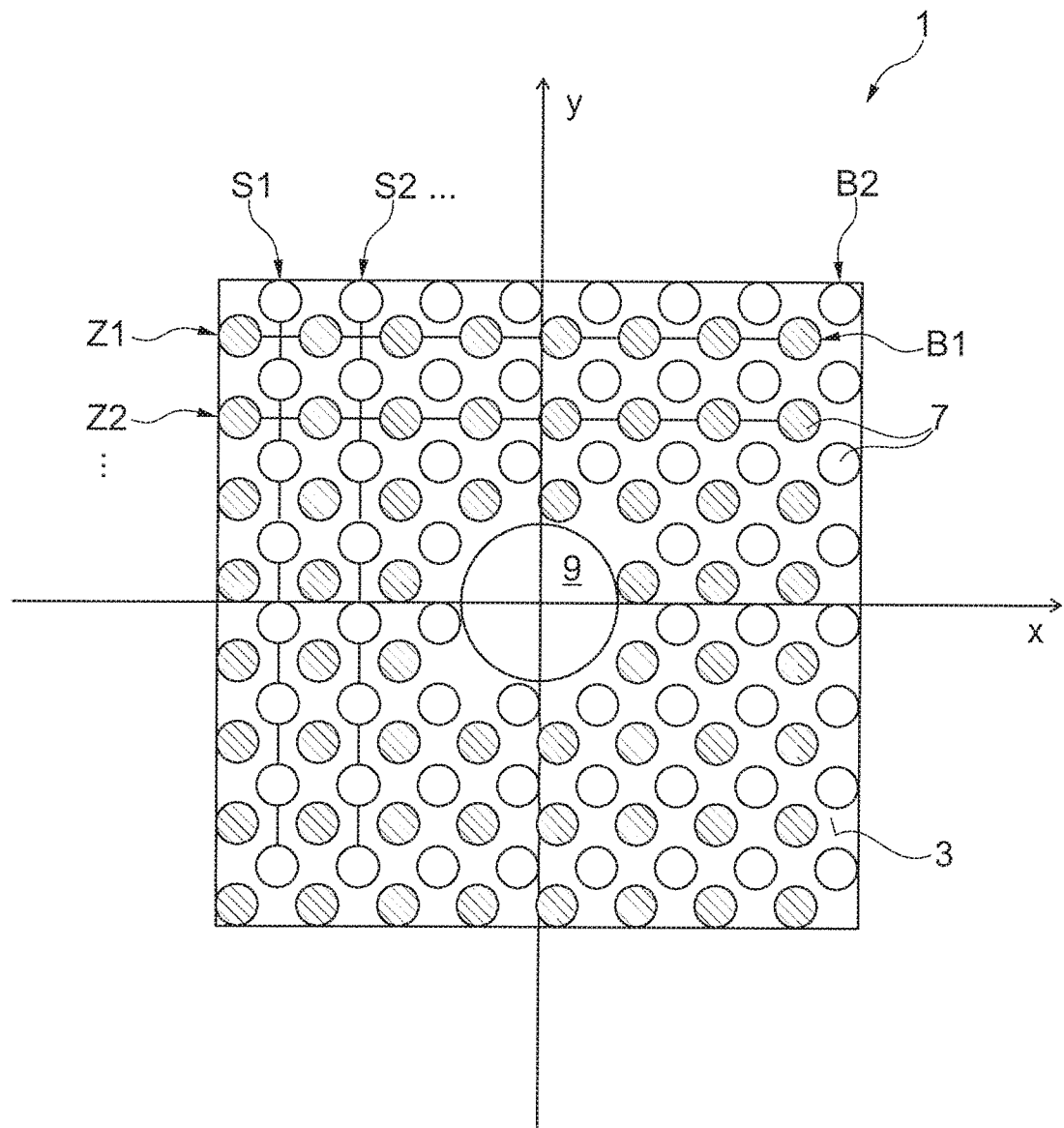

The invention is explained in more detail below with reference to the drawing, wherein:

FIGS. 1a and 1b show schematic illustrations of a first embodiment of an apparatus for planar illumination, in plan view and in side view, respectively, and FIG. 2 shows a schematic illustration of a second embodiment of the apparatus, in plan view.

FIG. 1 shows a schematic illustration of a first embodiment of an apparatus 1 for the planar illumination of objects, wherein FIG. 1a) shows a plan view of an emitting surface 3 and FIG. 1b) shows a side view of the apparatus 1.

DETAILED DESCRIPTION OF EXEMPLARY EMBODIMENTS

The apparatus 1 has an emitting surface 3 and at least two—in this case, four—illumination devices B1, B2, B3, B4 which can be controlled independently of each other. A first illumination device B1 in this case extends parallel to a second illumination device B2, and at an angle—particularly perpendicular, in this case—to a third illumination device B3 and to a fourth illumination device B4 arranged parallel to the same.

According to the invention, at least a planar illumination is used, which is suitable for depicting multiple structured illumination patterns—as well as a device for controlling the illumination. Optionally, a camera with a camera lens may be included. Optionally, the camera may have a computing device, particularly in the form of an FPGA, which is capable of performing calculations on the captured images and generating calculated images from the captured images by the application of suitable algorithms.

The component being inspected is illuminated by the planar structured illumination from a plurality of directions in space, and is captured by a camera which belongs to a device or is connected to the device. The resulting luminosity shadings in the captured images contain information about the topographic characteristics of the component surface.

The aim is to depict multiple illumination distributions by means of this planar illumination. In particular, illumination distributions can be depicted which have a light density along a coordinate axis which increases or decreases continuously, at least in sections, and which particularly preferably increases or decreases approximately linearly. For example, a light density produced by the first illumination device B1 can decrease at least approximately linearly with the position coordinate x, whereas, when the second illumination device B2 is activated, it increases at least approximately with the position coordinate x. This makes it possible to detect the local slope of the component surface in the x-coordinate direction. When the third illumination device B3 is activated, the light density can at least approximately decrease with the position coordinate y, whereas when the fourth illumination device B4 is activated, the light density increases linearly with the y-coordinate. Alternatively or additionally, the illumination distributions can also vary along other directions—for example, along the two diagonals with respect to the x- and y-axes. Alternatively, another distribution may be selected as a linear distribution—for example, a distribution which increases or decreases continuously at least in sections. Alternatively or additionally, cosine- or sine-shaped distributions, or distributions which approximate them, can be used, particularly those in which an offset is added to the cosine or sine function in such a manner that only positive function values are output.

A planar illumination which can depict illumination distributions having a light density which continuously increases or decreases, at least in sections, can thus particularly be constructed as follows. Light sources 7, preferably LEDs, are attached on the edges of a preferably rectangular, transparent, preferably diffusely scattering plate 5, and these can be switched independently of each other individually—but preferably in groups. Of the light sources 7, only one is marked with the reference number 7, for clarity's sake. An arrangement is particularly preferred in which one group of LEDs is attached on each of the four edges of a rectangular plate 5, forming an illuminating device which can be switched independently of the other groups. FIG. 1 shows such an arrangement. If the first illumination device B1 is activated, the result is an illumination distribution with a light density which decreases continuously along the x-axis at least in sections. If the second illumination device B2 is activated, the result is an illumination distribution with a light density which increases continuously along the x-axis at least in sections. When the third illumination device B3 is activated, the light density along the y-axis decreases continuously, at least in sections, whereas it increases continuously, at least in sections, when the fourth illumination device B4 is activated.

Alternatively, instead of a diffusely scattering plate, the transparent plate 5 may also be a clear transparent plate in which a diffuse scattering is preferably produced on the emitting surface 3 or on an boundary surface opposite it—for example, by roughening the emitting surface 3 or by applying a diffusely scattering film. Preferably, the plate can be equipped with a viewing area 9, preferably a central viewing area 9, and particularly with a bore hole, which forms a sight opening for a camera with a lens. An advantage of an arrangement with a transparent plate is the simple construction thereof. However, due to the sight opening, shaded areas may arise which interrupt the otherwise uniform course of the light density. Also, the light density which is achievable with such an arrangement is limited, since the light of the illuminations is coupled only into the edges of the plate 5. The shape of the plate 5 can be flat. Alternatively, however, the plate 5 can also be curved in a cylindrical shape, and/or can constitute parts of a cylinder. Alternatively, the shape of a cone or conical segment, or parts thereof, is possible. Other shapes are also possible, including the shape of a sphere or parts thereof, and/or free-form surfaces.

FIG. 2 therefore shows an arrangement as an alternative thereto, in which the light sources 7, particularly LED light sources, are distributed two-dimensionally on an electronic circuit board. Identical and functionally identical elements are indicated by the same reference numbers, such that reference is also made to the preceding description. In this case, an arrangement in the form of a rectangular matrix is particularly possible. Particularly preferably, the LEDs are arranged along the rows and/or columns of a matrix. An arrangement of the conductor paths of the circuit board is preferred which makes it possible to control the luminosity of a row and/or a column of LEDs of the illumination matrix as an illumination device independently of the other rows and/or columns. For this purpose, at least sections of rows and/or columns of LEDs are preferably connected in series. The luminosity of the LEDs of a row and/or column can be achieved by a separate current feed to each row and/or column. The current in this case varies from row to row and/or from column to column. According to the invention, the luminosity of the rows and/or columns is more advantageously controlled by the duration of current feed for each row or column being controlled independently, although the current remains constant. This can preferably be achieved via transistors included for each row and/or column. Preferably, the specific duration of current feed for each row and/or column is prespecified by a further electronic circuit which performs the illumination control. This controller is also advantageously integrated into the apparatus—for example, on the same circuit board which carries the light sources, or alternatively on a second circuit board which is electrically connected with the actual illumination circuit board. This second circuit board is advantageously arranged in a plane parallel to the illumination circuit board, such that the size of the arrangement can be minimized. A preferred design of the illumination circuit board has a rectangular, particularly square, outline. A design with a circular outline of the illumination circuit board is particularly preferred. Preferably, a viewing area 9 is included in the region of the illumination circuit board, as well as optionally in the controller circuit board arranged parallel thereto, which provides an opening for a camera to see a component being inspected. Preferably, this viewing area 9 is arranged in the center of the rectangular, square, circular or otherwise bounded illumination circuit board.

Preferably, the illumination circuit board is a flat circuit board. Alternatively, a flexible illumination circuit board is preferred which can also assume non-planar shapes. For example, it is possible in this way to position light sources 7 on a cylindrically curved illumination circuit board, such that light is radiated into the interior of the cylinder. This creates a light tunnel. Instead of a solid cylinder, the shape of a part of a cylinder can be alternatively selected—for example with a circumferential angle smaller than 360°. Alternatively, the light sources 7 can also be mounted on the outside of a cylindrically curved circuit board. Such an arrangement is advantageous for the internal inspection of bore holes and cavities. In this case as well, it is possible to realize parts of a cylinder. Alternatively, it is possible to realize other shapes. For example, the shape of a cone or a truncated cone segment, or parts thereof, can be realized by means of a flexible illumination circuit board. Preferably, the light sources 7 are then placed on the inside of the cone. This enables the illumination of an object being inspected from the largest possible dihedral angle. Alternatively, however, the light sources 7 can also be placed on the outer side. This is advantageous for the inspection of internal spaces.

Many other shapes are possible using flexible illumination circuit boards, including free-form surfaces. It is also possible to combine several flexible or not flexible circuit boards, or both. This is particularly advantageous if no flat design is possible for the desired shape, as, for example, in a spherical surface or parts thereof.

The illumination control is preferably performed by an illumination controller or control device integrated into the apparatus 1. Preferably, this includes at least one circuit part which operates digitally. Particularly preferred is a circuitry which includes an FPGA. Preferably, this control part is able to store the desired illumination distributions in the form of digital data. This data is preferably transmitted to the apparatus from the outside via an interface, for example by a computing device which processes the image data of the camera. A selection of the data makes it possible to easily prespecify, by way of example, an at least partially continuously increasing or decreasing profile of the light density along a coordinate axis, particularly a linear or a cosine- or sine-shaped curve, or a course which approximates these shapes. In addition, any other illumination distributions are possible and can be prespecified in a simple manner. The change of an illumination distribution to the next illumination distribution is preferably also performed by the illumination controller. Particularly, this change can be controlled via an interface of the apparatus 1, particularly an interface to a camera, which activates the illumination distributions synchronously with the image capture by utilizing a trigger signal.

Alternatively, it is also possible for the light sources, particularly the LEDs, to be interconnected in such a manner that each light source, particularly each LED, can be controlled independently of the other light sources, particularly LEDs. The control is also performed by a suitable illumination controller.

Overall, FIG. 2 shows an embodiment of the apparatus 1 in which a plurality of illumination devices B1, B2, in the form of rows and columns, by way of example rows Z1, Z2, . . . and columns S1, S2, . . . —schematically indicated with lines—are arranged on the emitting surface, wherein a first illumination device B1 is arranged in this case, by way of example, as a row, and a second illumination device B2 is arranged as a column on the emitting surface 3. The illumination devices B1, B2 can be controlled independently of each other row by row and/or column by column—preferably only as whole rows and/or columns.

Each of the illumination devices B1, B2 has a plurality of light sources 7 arranged along the extension direction of the respective illumination device B1, B2, which are preferably designed as LEDs.

The apparatus 1 in this case particularly comprises two groups of illumination devices—specifically a first group of illumination devices which has a plurality of first illumination devices B1 as rows, and a second group of illumination devices which has a plurality of second illumination devices B2 as columns on the emitting surface 3, wherein the groups of illumination devices can be controlled as rows and columns. To simplify the illustration, only one first illumination device B1 and only one second illumination device B2 are indicated with reference numbers. What is important is that rows, on the one hand, and columns, on the other hand, are each illustrated by separate illumination devices B1, B2, wherein each light source 7 is functionally assigned to exactly one illumination device B1, B2—either a row or a column, but not both a row and a column.

Immediately adjacent light sources 7—within an illumination device B1, B2—preferably have a distance—particularly from center to center or from midpoint to midpoint—of at least 0.5 mm to at most 200 mm, preferably of at least 1 mm to at most 100 mm, preferably of at least 2 mm to at most 50 mm, and preferably of at least 5 mm to at most 20 mm, preferably 10 mm. The distance, in particular the center distance, is preferably of at least 1 mm to at most 200 mm, preferably of at least 2 mm to at most 200 mm, preferably of at least 5 mm to at most 200 mm, and preferably of at least 10 mm to at most 200 mm. The distance, in particular the center distance, is preferably of at least 1 mm to at most 50 mm, preferably of at least 1 mm to at most 20 mm, and preferably of at least 1 mm to at most 10 mm.

A control device (not shown) for controlling the illumination devices B1, B2 is preferably adapted to change various illumination distributions at a frequency of at least 150 Hz to at most 2 MHz, preferably of at least 500 Hz to at most 1 MHz, preferably of at least 2 kHz to at most 200 kHz, and preferably of at least 10 kHz to at most 50 kHz, preferably 25 kHz. The control device is preferably adapted to change between different illumination distributions at a frequency of at least 500 Hz to at most 2 MHz, preferably of at least 2 kHz to at most 2 MHz, preferably of at least 10 kHz to at most 2 MHz, and preferably of at least 25 kHz to a maximum of 2 MHz. Preferably, the apparatus is adapted to change between different illumination distributions with a frequency of at least 150 Hz to at most 1 MHz, preferably of at least 150 Hz to at most 200 kHz, preferably of at least 150 kHz to at most 50 kHz, and preferably of at least 150 Hz to at most 25 kHz.

Furthermore, the control device is preferably adapted to control the luminosity of the illumination devices by specifying an illumination time for the individual illumination devices B1, B2.

A scattering element is preferably included in front of the emitting surface 3, particularly at a distance from the emitting surface 3.

Overall, it can be seen that a planar illumination of objects from different directions can be furnished by means of the apparatus, in a compact, simple, rapid, and very efficient manner, wherein it is possible, by using such an illumination, to detect even the smallest defects on components with challenging optical properties. A particularly optical inspection of components, keeping pace with a production cycle, is possible due to the simple, and optionally high-frequency, control of the apparatus 1.

The invention claimed is:

1. An apparatus for illuminating objects, the apparatus comprising:
an emitting surface;
at least two illumination devices arranged and designed to generate at least two different illumination distributions on the emitting surface;
a camera, the camera having an exposure time assigned to the camera; and
a control device for controlling the at least two illumination devices, the control device is configured to control a luminosity of the illumination devices by specifying a time, the control device further configured to individually adjust the luminosity of the illumination devices by controlling the illumination devices during the exposure time of the camera with illumination times which are shorter or the same length as the exposure time.

2. The apparatus according to claim 1, wherein the at least two illumination devices includes:
a first illumination device of the at least two illumination devices extending along a first direction, and a second illumination device of the at least two illumination devices extending along a second direction, and
wherein the first direction and the second direction are oriented at an angle to each other.

3. The apparatus according to claim 1, wherein the at least two illumination devices includes a plurality of illumination devices arranged in a form of rows and/or columns on the emitting surface, wherein the illumination devices are independently controllable of each other column by column and/or row by row.

4. The apparatus according to claim 1, wherein
at least one illumination device of the at least two illumination devices has an illumination source selected from a group consisting of: a plurality of light sources arranged next to each other along an extension of the illumination device; and
exactly one radiating source which has at least one light source,
wherein the light sources are LEDs.

5. The apparatus according to claim 4, wherein immediately adjacent radiating or light sources and/or immediately adjacent illumination devices have a distance—particularly a center-to-center distance—relative to each other of at least 0.5 mm to at most 200 mm.

6. The apparatus according to claim 1, wherein the at least two illumination devices includes at least two groups of illumination devices, wherein a first group of illumination devices is arranged and controllable as columns and a second group of illumination devices is arranged and controllable as rows on the emitting surface.

7. The apparatus according to claim 1, wherein the control device is adapted to change various illumination distributions at a frequency of at least 150 Hz to at most 2 MHz.

8. The apparatus according to claim 1, further comprising a scattering element arranged in front of the emitting surface at a distance from the emitting surface of at least 0.5 mm to at most 200 mm.

9. The apparatus according to claim 1, wherein the emitting surface is formed on a transparent plate, wherein at least two edges of the transparent plate each have one illumination device which is arranged in such a manner that radiation emitted by the illumination device is coupled into the transparent plate.

10. The apparatus according to claim 9, wherein the transparent plate has an output coupling structure.

11. The apparatus according to claim 1, wherein the emitting surface has a viewing area.

12. The apparatus according to claim 1, wherein the emitting surface is flat, bent or curved, and particularly is cylindrical, cylindrical-segment-shaped, cone-shaped, cone-segment-shaped, spherical, spherical-segment-shaped, in a form of a free-form surface, rectangular, circular or oval.

13. The apparatus according to claim 1, wherein light sources of at least one of the at least two illumination devices are at least partially connected in series.

14. The apparatus according to claim 1, wherein the at least two illumination devices includes a plurality of illumination devices arranged in a form of rows and/or columns on the emitting surface, wherein the illumination devices are only controllable as whole rows and/or whole columns.

15. The apparatus according to claim 1, wherein the emitting surface is a flat emitting surface and the illumination devices are arranged in a form of concentric rings on the flat emitting surface.

16. The apparatus according to claim 1, wherein the at least two illumination devices are arranged in a circular arrangement on the emitting surface, and form different sectors.

17. The apparatus according to claim 1, a first illumination device of the at least two illumination devices extends along a first angular coordinate, and a second illumination device of the at least two illumination devices extends along a radial coordinate or along a second angular coordinate which is different from the first angular coordinate.

18. The apparatus according to claim 1, wherein the at least two illuminated devices includes a plurality of illumination devices, each illumination device having exactly one and only one radiating source, the illumination devices being arranged in a form of a matrix on the emitting surface.

19. The apparatus according to claim 1, wherein the at least two illumination devices includes a plurality of illumination devices arranged in a form of rows and columns on the emitting surface, wherein the illumination devices are independently controllable by the control device column by column and independently controllable by the control device row by row.

20. The apparatus according to claim 1, wherein a first illumination device of the at least two illumination devices generates a first illumination distribution having a continuously decreasing light density along an axis, at least in sections, and a second illumination device of the at least two illumination devices generates a second illumination distribution having a continuously increasing light density along the axis.

* * * * *